(12) United States Patent
Kwiatkowski et al.

(10) Patent No.: US 10,325,398 B2
(45) Date of Patent: Jun. 18, 2019

(54) ABSOLUTE AGE FOR A DIGITAL INK STROKE

(71) Applicant: Microsoft Technology Licensing, LLC, Redmond, WA (US)

(72) Inventors: Paul J. Kwiatkowski, Redmond, WA (US); Travis P. Dorschel, Issaquah, WA (US); Andras Nagy, Bellevue, WA (US); Taylor S. Williams, Seattle, WA (US); Simon J. Schaffer, Seattle, WA (US); Craig A. Macomber, Seattle, WA (US); Christine M. Johnson, Redmond, WA (US); Michael Tang, Seattle, WA (US); Joshua M. Smithrud, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/871,928

(22) Filed: Jan. 15, 2018

(65) Prior Publication Data

US 2019/0096114 A1 Mar. 28, 2019

Related U.S. Application Data

(60) Provisional application No. 62/562,933, filed on Sep. 25, 2017, provisional application No. 62/566,242, filed on Sep. 29, 2017.

(51) Int. Cl.
*G06T 11/20* (2006.01)
*G06T 13/80* (2011.01)
(Continued)

(52) U.S. Cl.
CPC .......... *G06T 13/80* (2013.01); *G06F 3/03545* (2013.01); *G06F 3/04845* (2013.01);
(Continued)

(58) Field of Classification Search
CPC ..... G06T 13/80; G06T 3/0006; G06T 11/203; G06F 3/04883; G06K 9/00402
See application file for complete search history.

(56) References Cited

U.S. PATENT DOCUMENTS 5,434,959 A 7/1995 Von Eh et al.
6,268,865 B1 7/2001 Daniels et al.
(Continued)

OTHER PUBLICATIONS

"Corel® Painter™ 8", Retrieved From <<https://web.archive.org/web/20030805145426/http://www.corel.com/content/pdf/painter8/tutorials/Liquid_Ink.pdf>>, Aug. 5, 2003, pp. 1-32.
(Continued)

*Primary Examiner* — Antonio A Caschera
(74) *Attorney, Agent, or Firm* — Talem IP Law, LLP

(57) ABSTRACT

Techniques and systems for applying an ink effect to the drawing of an ink stroke can include absolute age for a digital ink stroke. A digital ink system can identify a reference time from which to represent a current time. The system can generate an absolute age of each ink point of the ink stroke based on the reference time. Then the ink effect can be applied to the ink stroke with a rhythm derived from when the ink stroke was originally drawn by using the absolute age of each ink point. In some cases, the rhythm can be the same rhythm as when the ink stroke was originally drawn. In other cases, the rhythm can be modified based on the rhythm the ink stroke was originally drawn. For example, the original rhythm may be accelerating, decelerating, skewed, compressed, affine, or non-affine.

20 Claims, 9 Drawing Sheets

(51) Int. Cl.

| | | |
|---|---|---|
| *G06F 3/0484* | (2013.01) | |
| *G06F 3/0488* | (2013.01) | |
| *G06T 3/00* | (2006.01) | |
| *G06T 11/60* | (2006.01) | |
| *G06T 15/50* | (2011.01) | |
| *G06T 15/60* | (2006.01) | |
| *G06F 17/24* | (2006.01) | |
| *G06F 3/0354* | (2013.01) | |

(52) U.S. Cl.
CPC ........ *G06F 3/04883* (2013.01); *G06F 17/242* (2013.01); *G06T 3/0006* (2013.01); *G06T 3/0093* (2013.01); *G06T 11/203* (2013.01); *G06T 11/60* (2013.01); *G06T 15/506* (2013.01); *G06T 15/60* (2013.01); *G06T 2215/12* (2013.01)

(56) References Cited

U.S. PATENT DOCUMENTS

| | | |
|---|---|---|
| 7,158,138 B1 | 1/2007 | Bronskill et al. |
| 7,427,984 B2 | 9/2008 | Smirnov et al. |
| 8,487,963 B1 | 7/2013 | Harris et al. |
| 9,192,874 B2 | 11/2015 | Moll et al. |
| 2004/0233196 A1 | 11/2004 | Hertzmann |
| 2007/0268304 A1 | 11/2007 | Hsu |
| 2008/0266309 A1 | 10/2008 | Sander et al. |
| 2011/0304643 A1 | 12/2011 | Marison |
| 2013/0057540 A1 | 3/2013 | Winnemoeller et al. |
| 2013/0342560 A1 | 12/2013 | Joshi |
| 2014/0355884 A1 | 12/2014 | Tran et al. |
| 2015/0347000 A1 | 12/2015 | Ookawara |
| 2016/0034752 A1* | 2/2016 | Tung ................ G06K 9/00429 382/189 |
| 2016/0232146 A1 | 8/2016 | Su et al. |
| 2016/0253300 A1 | 9/2016 | Tu et al. |
| 2017/0139556 A1* | 5/2017 | Josephson ............ G06F 3/0482 |
| 2017/0212612 A1* | 7/2017 | Zhou ................ G06F 3/03545 |
| 2017/0236318 A1 | 8/2017 | Ellbogen et al. |
| 2019/0096100 A1 | 3/2019 | Schaffer et al. |
| 2019/0096123 A1 | 3/2019 | Schaffer et al. |

OTHER PUBLICATIONS

"Glitterati", Retrieved From <<https://itunes.apple.com/us/app/glitterati/id410052281?mt=8>>, Oct. 11, 2012, 2 Pages.

"OneNote July roundup", Retrieved From <<https://blogs.office.com/en-us/2016/07/21/onenote-july-roundup/>>, Jul. 21, 2016, 5 Pages.

"Providing Erasers", Retrieved From <<https://msdn.microsoft.com/en-us/library/ms698143(v=vs.85).aspx>>, Aug. 2, 2011, 2 Pages.

Bowden, Zac, "Windows Ink: How to use Screen Sketch", Retrieved From <<https://www.windowscentral.com/windows-ink-how-use-screen-sketch>>, Sep. 26, 2016, 15 Pages.

"Non Final Office Action Issued in U.S. Appl. No. 15/871,923", dated Oct. 1, 2018, 24 Pages.

"Non Final Office Action Issued in U.S. Appl. No. 15/872,821", dated Sep. 7, 2018, 65 Pages.

"International Search Report and Written Opinion Issued in PCT Application No. PCT/US18/039208", dated Sep. 17, 2018, 13 Pages.

"Final Office Action Issued in U.S. Appl. No. 15/872,821", dated Feb. 15, 2019, 63 Pages.

* cited by examiner

ABSOLUTE AGE FOR A DIGITAL INK STROKE

CROSS REFERENCE TO RELATED APPLICATIONS

This application claims the benefit of U.S. Provisional Application Ser. No. 62/562,933, filed Sep. 25, 2017 and U.S. Provisional Application Ser. No. 62/566,242 filed Sep. 29, 2017.

BACKGROUND

Content creation applications such as notebook applications, word processing applications, spreadsheet applications, and presentation applications are useful tools for generating and curating content. These and other applications are increasingly including "inking" functionality that lets users input content and interact with the application (and content created therein) through using a pen or stylus (and sometimes fingers or other objects) in a manner evoking a pen on paper. Digital ink can imitate real writing utensils such as pens, pencils or paintbrushes, or it can be used to create visual effects that have no real-world analog.

However, because the system must know how much time has passed since an ink point has been drawn, applying certain ink effects to the drawing of an ink stroke can be challenging. Currently, ink stroke data includes global timestamps. However, global timestamps do not provide the amount of time that has elapsed since the ink point has been drawn.

BRIEF SUMMARY

Techniques and systems for applying an ink effect to the drawing of an ink stroke are provided. The techniques presented provide absolute age for a digital ink stroke. Absolute age is a new parameter for an ink stroke that indicates an amount of time that has elapsed from when an ink point is drawn in a manner that supports other processes such as advanced playback and ink effects.

A digital ink system can identify a reference time from which to represent a current time. The system can generate an absolute age of each ink point of the ink stroke based on the reference time. Then the ink effect can be applied to the ink stroke with a rhythm derived from when the ink stroke was originally drawn by using the absolute age of each ink point.

In some cases, the rhythm can be the same rhythm as when the ink stroke was originally drawn. In other cases, the rhythm can be modified based on the rhythm the ink stroke was originally drawn. For example, the original rhythm may be accelerating, decelerating, skewed, compressed, affine, or non-affine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
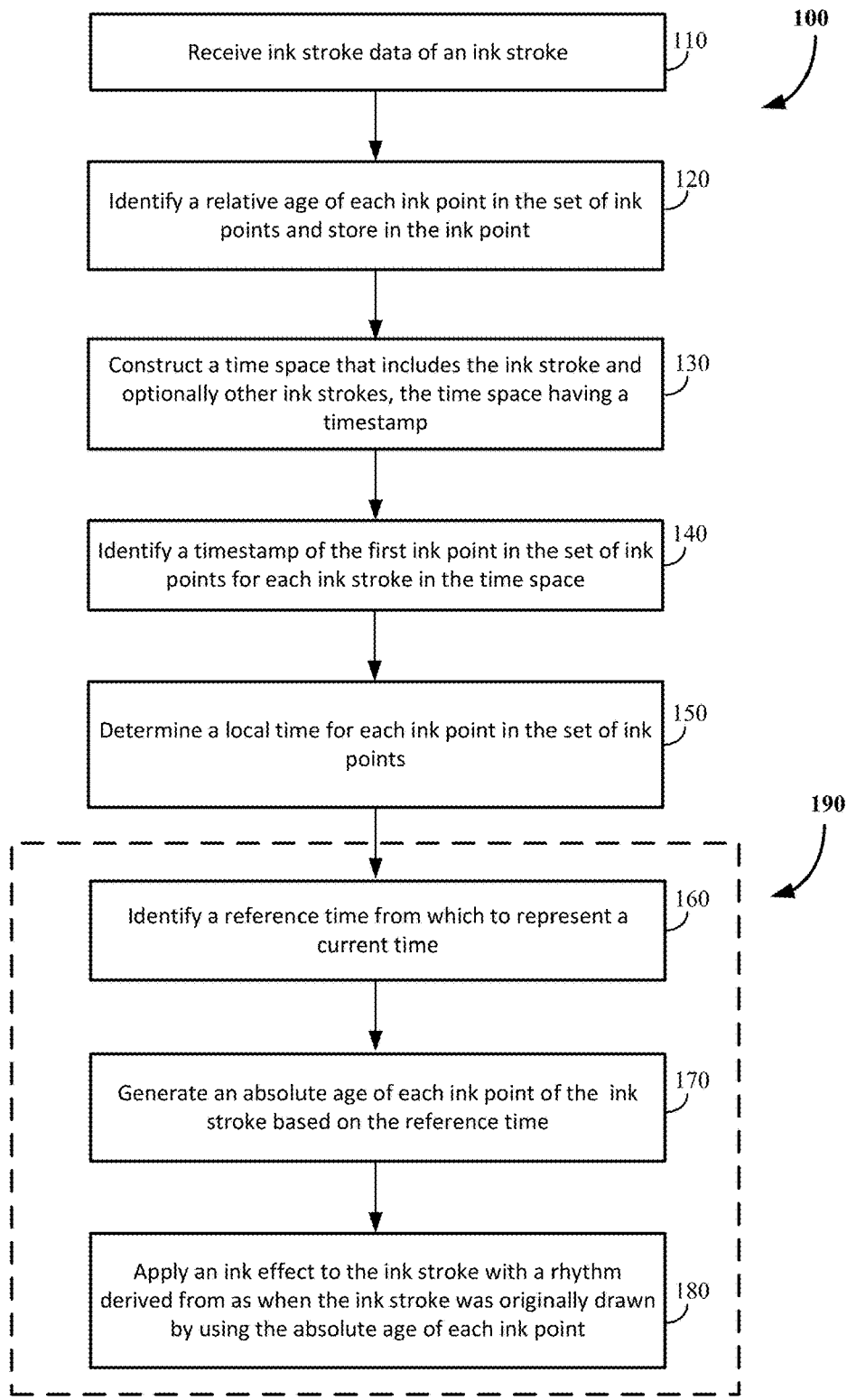
FIG. 1 illustrates an example process flow diagram for a method for applying an ink effect to the drawing of an ink stroke.

Techniques and systems for applying an ink effect to the drawing of an ink stroke are described. The techniques discussed herein enable a consistent application of an ink effect, and allow the ink effect to properly animate the same every time the ink stroke is rendered. In particular, an absolute age parameter for a digital ink stroke is provided.

A digital ink system can generate an absolute age of each ink point of the ink stroke based on a reference time from which to represent a current time. Then, the ink effect can be applied to the ink stroke with a rhythm derived from when the ink stroke was originally drawn by using the absolute age of each ink point.

There are numerous advantages to using absolute age when applying the ink effect. One advantage of using absolute age is that an ink effect can be applied to the ink stroke with a rhythm derived from when the ink stroke was originally drawn. For example, an ink effect can be applied to the ink stroke with the same rhythm as when the ink stroke was originally drawn. Therefore, any time the ink effect is applied to the ink stroke, whether it's in a playback scenario or if a new ink effect is applied to a previously drawn ink stroke, the ink effect will have the same rhythm each time.

In some cases, the rhythm can be the same rhythm as when the ink stroke was originally drawn. In other cases, the rhythm can be modified based on the rhythm the ink stroke was originally drawn. For example, the original rhythm may be accelerating, decelerating, skewed, compressed, affine, or non-affine. Accordingly, the rhythm of an applied ink effect can be modified, while still providing the proper animation.

The described techniques are applicable for any application that supports "inking" or "digital ink", which refers to the mode of user input where a stylus or pen (or even user finger on a touch screen or pad or possibly a mouse) is used to capture handwriting in its natural form.

A digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected.

Ink stroke data refers to a set of properties and point data that a digitizer captures that represent the coordinates and properties of a "marking". It can be the set of data that is captured in a single pen down, up, or move sequence. The set of data can include parameters such as, but not limited to, position, a beginning of the stroke, an end of the stroke, the pressure of the stroke, the tilt (e.g., of a pen) for the stroke (can also be referred to as the azimuth), the direction of the stroke, the time and timing of the stroke between discrete coordinates along the path of the stroke, and the color of the 'ink'

The ink stroke data of an ink stroke can include a set of ink points, as well as a mathematical center-line comprising set of ink segments that connect the ink points. One ink point of the set of ink points can correspond to one unit of input data, plus metadata, including relative time. The ink points can be represented as a nib shape. Nib shape refers to the shape of the pen that a user is drawing with. The nib shape may be, but is not limited to, a circle, an ellipse, or a rectangle.

Figure 2A:
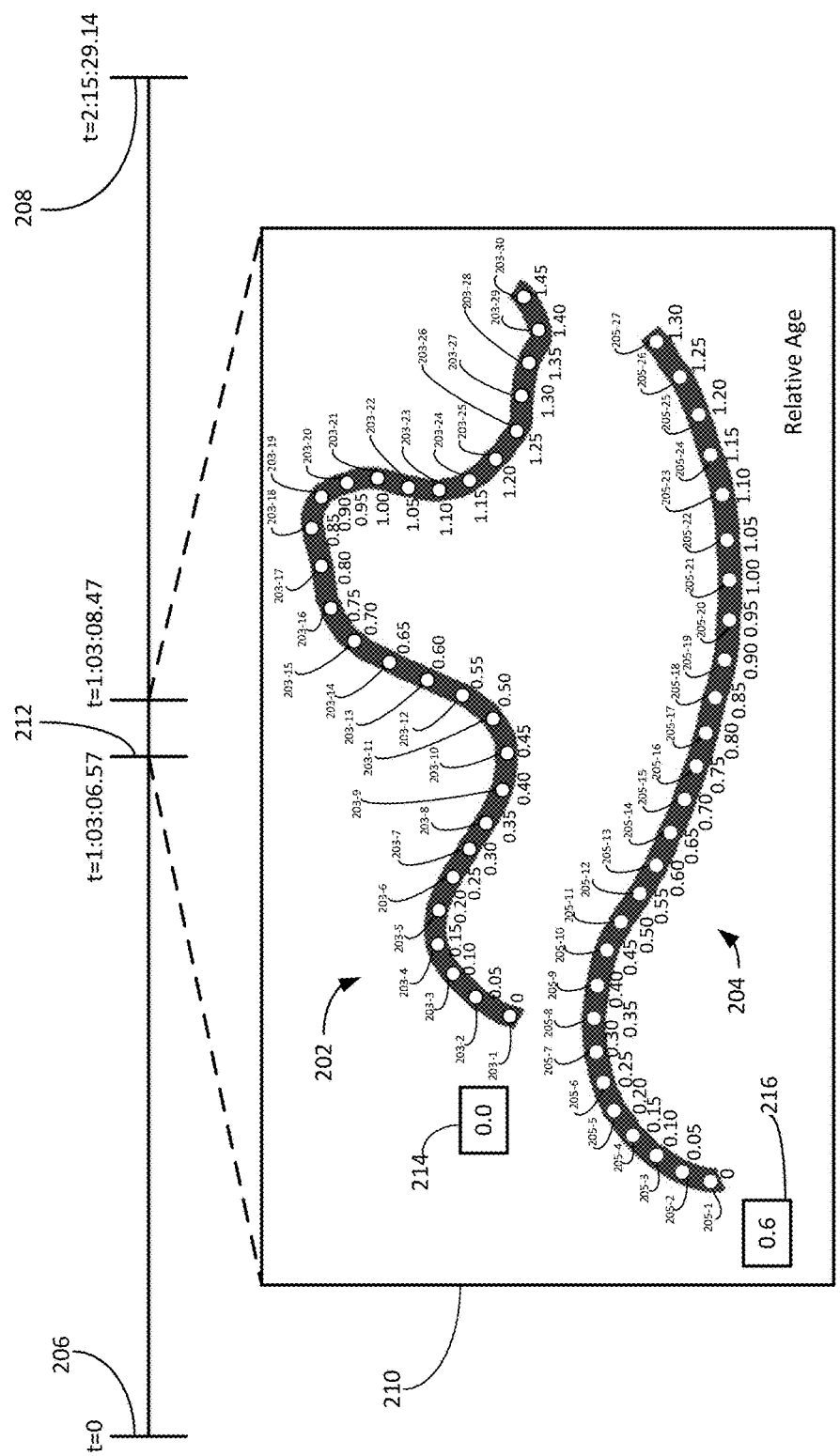
FIG. 2A illustrates an example representation of time space.
Figure 2B:
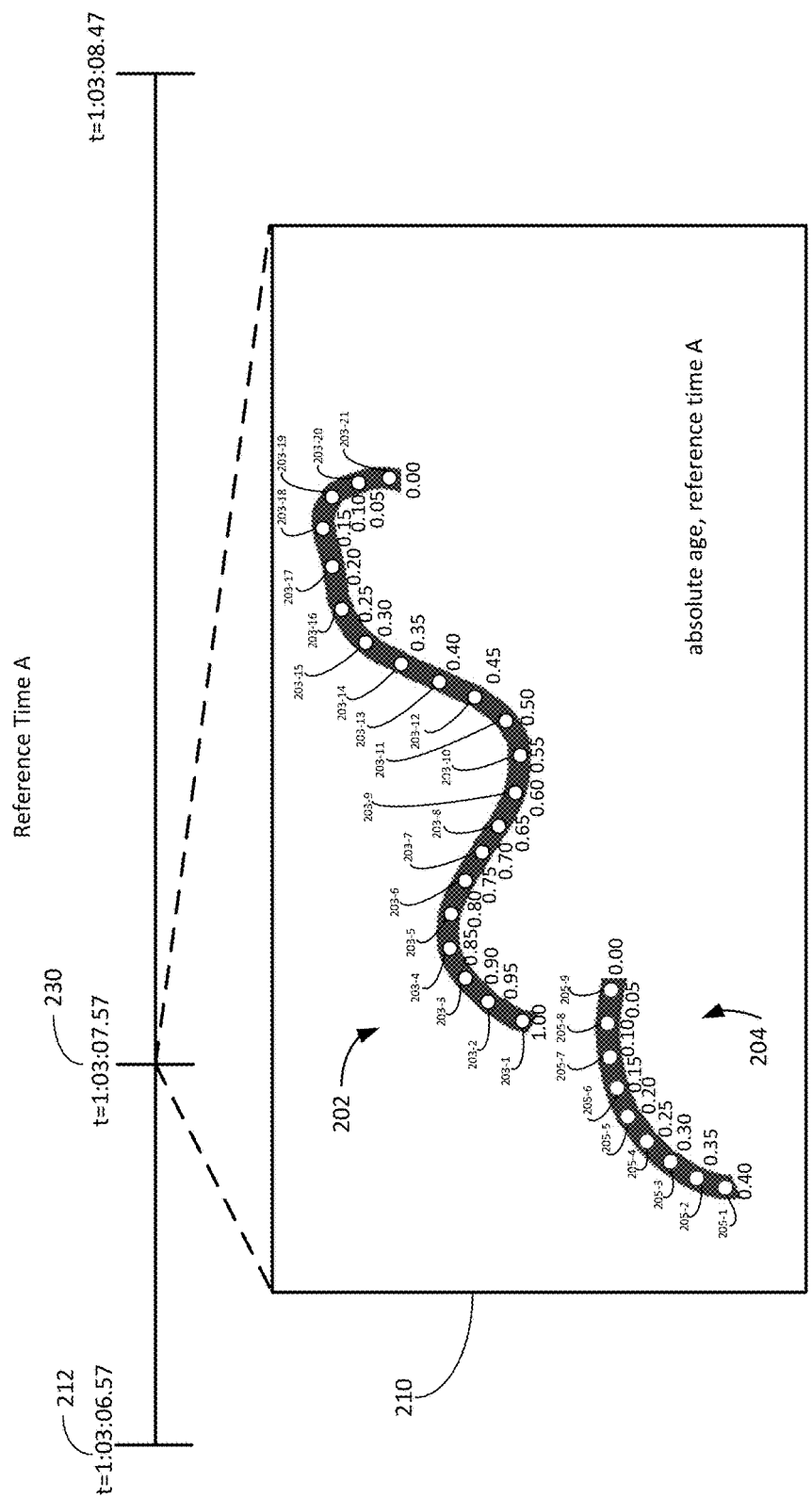
FIG. 2B and FIG. 2C illustrate example representation of absolute age generated for each ink point of an ink stroke based on an example reference time.
Figure 2C:
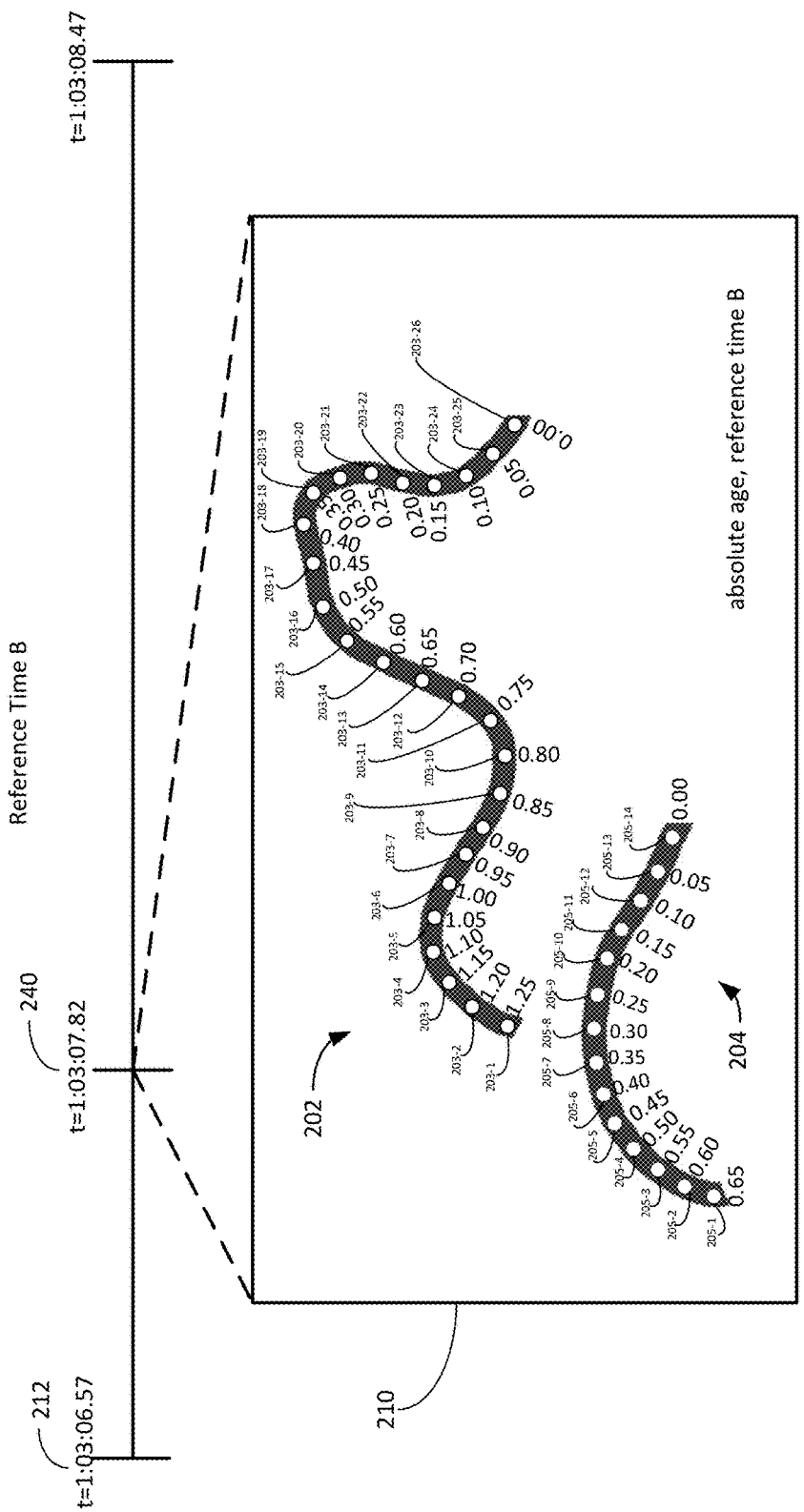
Figure 3A:
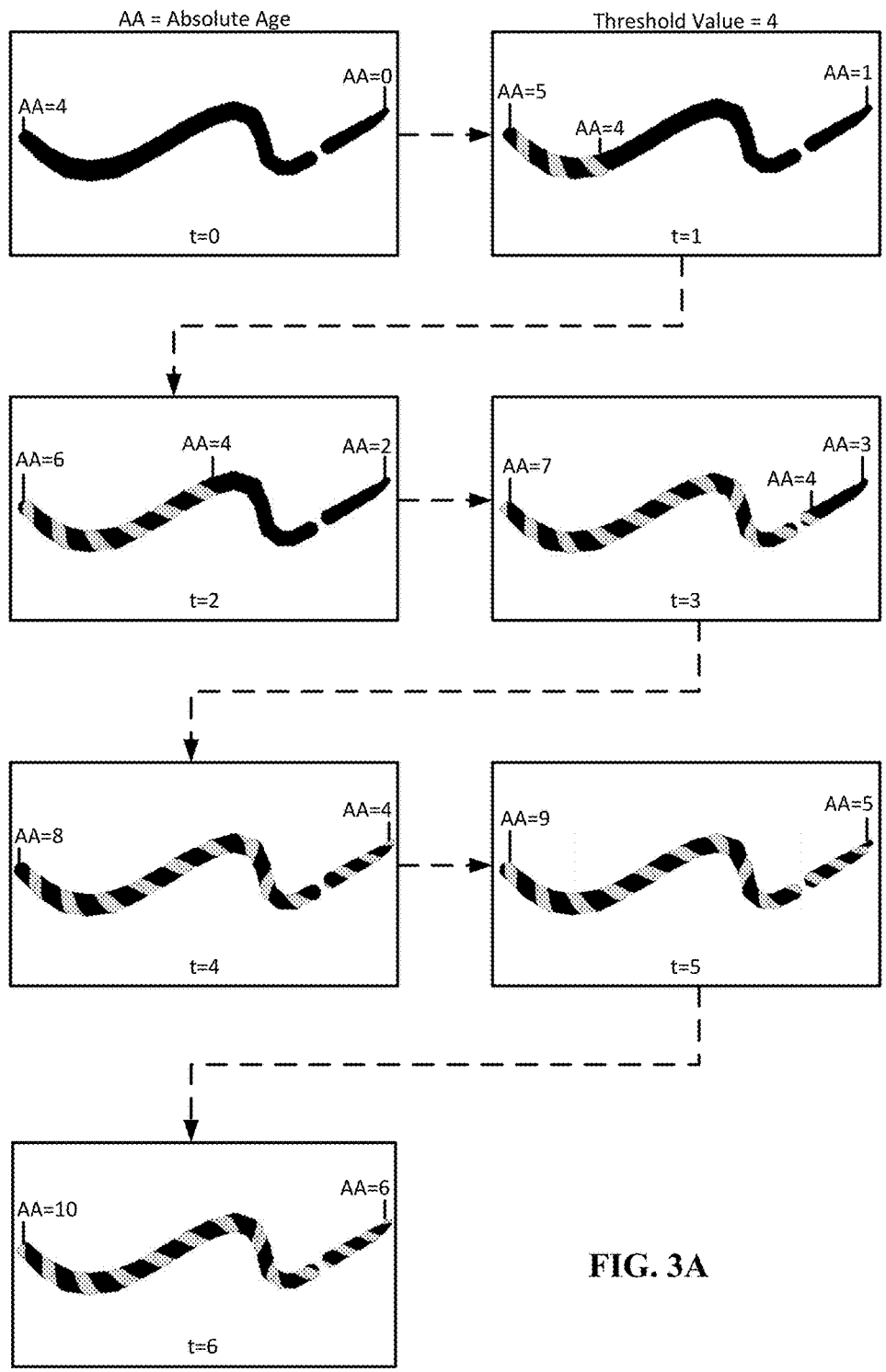
FIG. 3A and FIG. 3B illustrate example scenarios of applying an ink effect to the drawing of an ink stroke using absolute age.
Figure 3B:
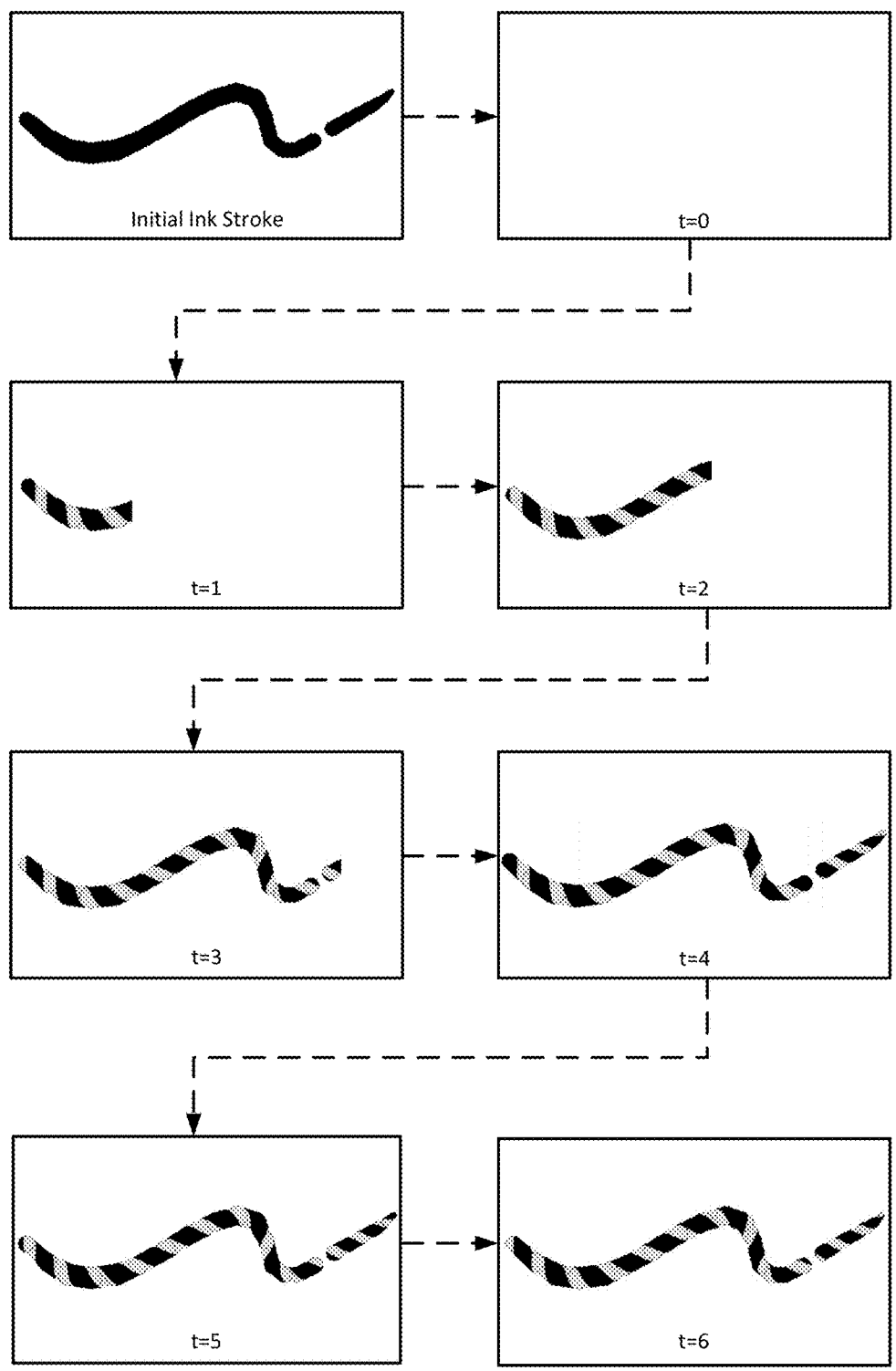

FIG. 1 illustrates an example process flow diagram for a method for applying an ink effect to the drawing of an ink stroke; FIG. 2A illustrates an example representation of time space; FIG. 2B and FIG. 2C illustrate example representations of absolute age generated for each ink point of an ink stroke based on an example reference time; and FIG. 3A and FIG. 3B illustrate example scenarios of applying an ink effect to the drawing of an ink stroke using absolute age.

Process 100 of FIG. 1 includes operations 110, 120, 130, 140, 150, 160, 170, and 180, where process 190, which includes operations 160, 170, and 180, can be performed each time an ink stroke is rendered. Referring to FIG. 1 and FIG. 2A, an ink stroke may be input during an inking session of a content creation application, such as a whiteboard application. In the example scenario of FIG. 2A, an inking session took place over two hours, having a start time 206 of t=0 and an end time 208 of t=2:15:29.14.

Process 100 begins with the digital ink system receiving (110) ink stroke data of an ink stroke. As previously described, the ink stroke data can include a set of ink points. A relative age of each ink point can be identified (120) for each ink stroke. The relative age for each ink point can be identified as the offset from the first ink point in the ink stroke. The relative age of each ink point is stored in the ink point and can be in a compressed form. In some cases, as every ink point is drawn, a precise timestamp is recorded along with its on-screen coordinates. The ink point can be timestamped to a high precision (e.g., in microseconds).

A time space may be constructed (130) that includes the ink stroke or, optionally, multiple ink strokes. The time space is a coordinate system used to represent time and may be constructed for one ink stroke or for multiple ink strokes that overlap in time (e.g., which may occur in a collaborative session and/or when a user is drawing with multiple pens at the same time). A time space has a timestamp ("time space timestamp") to identify the time of the initial frame of the time space within the inking session. Once the time space is constructed, a timestamp ("ink stroke timestamp") of a first ink point of each ink stroke contained in the time space can be identified (140). The ink stroke timestamp (e.g., ink stroke timestamp 214 and ink stroke timestamp 216 shown in FIG. 2A) can be identified relative to the time space timestamp (e.g., time space timestamp 212 shown in FIG. 2A). A local time for each ink point of the set of ink points can also be determined (150). The local time can represent the time within the inking session in which the ink point was drawn. The local time for each ink point can be based on the time space timestamp, the ink stroke timestamp, and the relative age of the ink point.

In the example of FIG. 2A, ink stroke data from a first ink stroke 202, including a first set of ink points, from a first ink stroke 202 is received (e.g., operation 110) during the session. The first ink stroke 202 is drawn in a left to right direction using a circular nib and includes a set of ink points 203 (ink point 203-1 through ink point 203-30). Each ink point (e.g., ink point 203-1 through ink point 203-30) in the first ink stroke 202 is shown labeled with its relative age (e.g., as identified by operation 120).

Specifically, the relative age of the first ink point 203-1 in the first ink stroke 202 is set at 0. Then, the relative age of each of the remaining ink points (e.g., ink point 203-2 through ink point 203-30) is identified based on the offset from the relative age of the first ink point 203-1. In this example, each ink point has a 0.05 second offset from the previous ink point. Therefore, the second ink point 203-2 has a relative age of 0.05 seconds; the third ink point 203-3 has a relative age of 0.10 seconds; the fourth ink point 203-4 has a relative age of 0.15 seconds; the fifth ink point 203-5 has a relative age of 0.20 seconds; the sixth ink point 203-6 has a relative age of 0.25 seconds; the seventh ink point 203-7 has a relative age of 0.30 seconds; the eighth ink point 203-8 has a relative age of 0.35 seconds; the ninth ink point 203-9 has a relative age of 0.40 seconds; the tenth ink point 203-10 has a relative age of 0.45 seconds; the eleventh ink point 203-11 has a relative age of 0.50 seconds; the twelfth ink point 203-12 has a relative age of 0.55 seconds; the thirteenth ink point 203-13 has a relative age of 0.60 seconds; the fourteenth ink point 203-14 has a relative age of 0.65 seconds; the fifteenth ink point 203-15 has a relative age of 0.70 seconds; the sixteenth ink point 203-16 has a relative age of 0.75 seconds; the seventeenth ink point 203-17 has a relative age of 0.80 seconds; the eighteenth ink point 203-18 has a relative age of 0.85 seconds; the nineteenth ink point 203-19 has a relative age of 0.90 seconds; the twentieth ink point 203-20 has a relative age of 0.95 seconds; the twenty-first ink point 203-21 has a relative age of 1.0 second; the twenty-second ink point 203-22 has a relative age of 1.05 seconds; the twenty-third ink point 203-23 has a relative age of 1.10 seconds; the twenty-fourth ink point 203-24 has a relative age of 1.15 seconds; the twenty-fifth ink point 203-25 has a relative age of 1.20 seconds; the twenty-sixth ink point 203-26 has a relative age of 1.25 seconds; the twenty-seventh ink point 203-27 has a relative age of 1.30 seconds; the twenty-eighth ink point 203-28 has a relative age of 1.35 seconds; the twenty-ninth ink point 203-29 has a relative age of 1.40 seconds; and the thirtieth ink point 203-30 has a relative age of 1.45 seconds.

The user starts to draw the first ink stroke 202 at t=1:03:06.57 of the inking session and finishes drawing the first ink stroke 202 at t=1:03:08.02 of the inking session. While the first ink stroke is still being drawn, at 1=1:03:07.17 of the inking session, a second user starts to draw the second ink stroke 204. Ink stroke data, including a second set of ink points, from a second ink stroke 204 is received (e.g., operation 110) by the system. The second ink stroke 204 is drawn in a left to right direction using a circular nib and includes a set of ink points 205 (ink point 205-1 through ink point 205-27). The second user finishes drawing the second ink stroke 204 at t=1:03:08.47 of the inking session.

Similar to the first ink stroke 202, a relative age (e.g., as identified by operation 120) is shown for each ink point (e.g., ink point 205-1 through ink point 205-27) in the second ink stroke 204. The relative age of the first ink point 205-1 in the second ink stroke 204 is set at 0. Then, the relative age of the remaining ink points (e.g., ink point 205-2 through ink point 205-27) is identified based on the offset from the relative age of the first ink point 205-1. In this example, each ink point has a 0.05 second offset from the previous ink point. Therefore, the second ink point 205-2 has a relative age of 0.05 seconds; the third ink point 205-3 has a relative age of 0.10 seconds; the fourth ink point 205-4 has a relative age of 0.15 seconds; the fifth ink point 205-5 has a relative age of 0.20 seconds; the sixth ink point 205-6 has a relative age of 0.25 seconds; the seventh ink point 205-7 has a relative age of 0.30 seconds; the eighth ink point 205-8 has a relative age of 0.35 seconds; the ninth ink point 205-9 has a relative age of 0.40 seconds; the tenth ink point 205-10 has a relative age of 0.45 seconds; the eleventh ink point 205-11 has a relative age of 0.50 seconds; the twelfth ink point 205-12 has a relative age of 0.55 seconds; the thirteenth ink point 205-13 has a relative age of 0.60 seconds; the fourteenth ink point 205-14 has a relative age of 0.65 seconds; the fifteenth ink point 205-15 has a relative age of 0.70 seconds; the sixteenth ink point 205-16 has a relative age of 0.75 seconds; the seventeenth ink point 205-17 has a relative age of 0.80 seconds; the eighteenth ink point 205-18 has a relative age of 0.85 seconds; the nineteenth ink point 205-19 has a relative age of 0.90 seconds; the twentieth ink point 205-20 has a relative age of 0.95 seconds; the twenty-first ink point 205-21 has a relative age of 1.0 second; the twenty-second ink point 205-22 has a relative age of 1.05 seconds; the twenty-third ink point 205-23 has a relative age of 1.10 seconds; the twenty-fourth ink point 205-24 has a relative age of 1.15 seconds; the twenty-fifth ink point 205-25 has a relative age of 1.20 seconds; the twenty-sixth ink point 205-26 has a relative age of 1.25 seconds; and the twenty-seventh ink point 205-27 has a relative age of 1.30 seconds.

It should be understood that the number of ink points are for illustrative purposes and more or fewer may exist. In addition, the offset between ink points of an ink stroke may vary. Further, the use of a circular nib is merely one possible nib type that can be used.

In this illustration, the first ink stroke 202 and the second ink stroke 204 are assigned the same time space. Therefore, a time space 210 can be constructed (e.g., operation 130) containing both the first ink stroke 202 and the second ink stroke 204. Here, the time space 210 occupies t=1:03:06.57 through t=1:03:08.47 of the inking session. Therefore, the time space 210 has a time space timestamp 212 of t=1:03:06.57, which correlates to the time of the initial frame in the time space 210 with respect to the overall time of the inking session. Multiple ink strokes can be assigned a same time space to address continuity errors and ink input glitches. In some cases, the time that the ink strokes are input help determine whether the ink strokes will be assigned the same time space. For example, two separate ink strokes that overlap in time can be assigned the same time space.

Since the time space timestamp 212 is 1=1:03.06.57 and the first ink stroke 202 was started at t=1:03:06.57, the first ink point 203-1 of the first ink stroke 202 has an ink stroke timestamp 214 of 0.0. Since the second ink stroke 204 was started at t=1:03:07.17 of the inking session, the second ink stroke 204 was started 0.6 seconds into the time space 210 and the first ink point 205-1 has an ink stroke timestamp 216 of 0.6. The local time for each ink point can also be determined (e.g., operation 150). For example, the local time for the first ink point 203-1 in the first ink stroke 202 is 1:03:06.57, the local time for the second ink point 203-2 is 1:03:06.57, the local time for the first ink point 205-1 in the second ink stroke 204 is 1:03:07.17; and the local time for the twenty-seventh ink point 205-27 is 1:03:08.47.

Returning to FIG. 1, process 100 can continue with the operations that can be carried out as part of process 190, which as mentioned above, can be performed every time an ink stroke is re-rendered. That is, the operations of process 190 can be used to animate an ink stroke while it is being originally being drawn, animate an already drawn ink stroke, or re-draw the ink stroke during playback.

As process 190 starts, a reference time from which to represent a current time can be identified (160). For the first occurrence of process 190, the reference time is occurring in real-time of the inking session. Subsequent to the first time that process 190 is performed, the reference time can be any time. Identifying the reference time can allow the client application or client platform to globally control and define the notion of the "present time". Therefore, the reference time is the current moment in time. The reference time for the ink stroke can be identified every time the ink stroke is rendered. Therefore, the reference time can change from rendering occasion to rendering occasion. For example, if the ink stroke is rendered every frame, the reference time can then be identified for every frame of the inking session.

In some cases, the reference time can be identified as the current OS clock time. In other cases, the reference time can be identified as the current moment in the playback of the inking session.

An absolute age of each ink point of the ink stroke can then be generated based on the reference time (170). The absolute age for the ink point can be generated using the delta between the reference time and the local time of the ink point. The absolute age can be generated for an ink point as the ink point is drawn for the first time, as well as any time the ink point is subsequently rendered. For example, the absolute age can be generated for each ink point as the ink point is rendered.

The absolute age can be generated for each ink point in the ink stroke that is rendered at a given reference time. For example, if a user starts the playback of an inking session at a point in time where only a portion of an ink stroke was drawn, the absolute age can be generated for each ink point that is being rendered at that point in time (e.g., the reference time).

The ink point that has the same local time and reference time has an absolute age of 0 and thus becomes an anchor ink point. The anchor point can be a temporal anchor located at the origin of the time space for the current frame being rendered. The anchor ink point can represent the last ink point drawn in the ink stroke at the current time and any ink points before the anchor ink point can be thought of as being drawn in the past and any ink points after the anchor ink point can be thought of as being drawn in the future.

FIGS. 2B and 2C show snapshots of an individual frame of the time space 210 shared by the first ink stroke 202 and the second ink stroke 204. FIG. 2B is at reference time A and FIG. 2C is at reference time B. In the example of FIG. 2B, one frame, at t=1:03:07.57 of the inking session, is shown. Reference time A 230 of t=1:03:07.57 is considered the current moment in time. Since the reference time A 230 is 1=1:03:07.57, the current moment in time is when the first ink stroke 202 is 1.0 second old and the second ink stroke 204 is 0.40 seconds old. The absolute age for each ink point in the first ink stroke 202 and the second ink stroke 204 in time space 210 can be generated using the reference time A 230 and the local time, such as described with respect to FIG. 2A.

For the first ink stroke 202, since ink point 202-21 has a local time of t=1:03:07.57, ink point 202-21 is the anchor ink point and has an absolute age of 0. For the time space 210 at the reference time A 230, only the ink points up to and including the anchor ink point (e.g., ink point 202-1 through ink point 202-21) would be rendered, as the rest of the ink points (e.g., ink point 202-22 through ink point 202-30) are drawn at a time after the reference time A 230.

Using the calculations described above, the first ink point 203-1 has an absolute age of 1.00. An absolute age of 1.00 means that the first ink point 203-1 is 1.00 seconds old because it was drawn 1.00 seconds in the past, relative to the reference time A 230. The second ink point 203-2 has an absolute age of 0.95 seconds; the third ink point 203-3 has an absolute age of 0.90 seconds; the fourth ink point 203-4 has an absolute age of 0.85 seconds; the fifth ink point 203-5 has an absolute age of 0.80 seconds; the sixth ink point 203-6 has an absolute age of 0.75 seconds; the seventh ink point 203-7 has an absolute age of 0.70 seconds; the eighth ink point 203-8 has an absolute age of 0.65 seconds; the ninth ink point 203-9 has an absolute age of 0.60 seconds; the tenth ink point 203-10 has an absolute age of 0.55 seconds; the eleventh ink point 203-11 has an absolute age of 0.50 seconds; the twelfth ink point 203-12 has an absolute age of 0.45 seconds; the thirteenth ink point 203-13 has an absolute age of 0.40 seconds; the fourteenth ink point 203-14 has an absolute age of 0.35 seconds; the fifteenth ink point 203-15 has an absolute age of 0.30 seconds; the sixteenth ink point 203-16 has an absolute age of 0.25 seconds; the seventeenth ink point 203-17 has an absolute age of 0.20 seconds; the eighteenth ink point 203-18 has an absolute age of 0.15 seconds; the nineteenth ink point 203-19 has an absolute age of 0.10 seconds; and the twentieth ink point 203-20 has an absolute age of 0.05 seconds.

For the second ink stroke 204, since ink point 205-9 has a local time of t=1:03:07.57, ink point 205-9 is the anchor ink point and has an absolute age of 0. For the time space 210 at the reference time A 230, only the ink points up to and including the anchor ink point (e.g., ink point 205-1 through ink point 205-9) would be rendered, as the rest of the ink points (e.g., ink point 205-10 through ink point 205-27) are drawn at a time after the reference time A 230.

Using the calculations described above, the first ink point 205-1 has an absolute age of 0.40. An absolute age of 0.40 means that the first ink point 205-1 is 0.40 seconds old because it was drawn 0.40 seconds in the past, relative to the reference time A 230. The second ink point 205-2 has an absolute age of 0.35 seconds; the third ink point 205-3 has an absolute age of 0.30 seconds; the fourth ink point 205-4 has an absolute age of 0.25 seconds; the fifth ink point 205-5 has an absolute age of 0.20 seconds; the sixth ink point 205-6 has an absolute age of 0.15 seconds; the seventh ink point 205-7 has an absolute age of 0.10 seconds; and the eighth ink point 205-8 has an absolute age of 0.05 seconds.

In the example of FIG. 2C, one frame, at t=1:03:07.82 of the inking session, is shown. Reference time B 240 of t=1:03:07.82 is considered the current moment in time. Since the reference time B 240 is t=1:03:07.82, the current moment in time is when the first ink stroke 202 is 1.25 seconds old and the second ink stroke 204 is 0.65 seconds old.

For the first ink stroke 202, since ink point 202-26 has a local time of t=1:03:07.82, ink point 202-26 is the anchor ink point and has an absolute age of 0. For the time space 210 at the reference time B 240, only the ink points up to and including the anchor ink point (e.g., ink point 202-1 through ink point 202-26) would be rendered, as the rest of the ink points (e.g., ink point 202-27 through ink point 202-30) are drawn at a time after the reference time B 240.

The first ink point 203-1 has an absolute age of 1.25. An absolute age of 1.25 means that the first ink point 203-1 is 1.25 seconds old because it was drawn 1.25 seconds in the past, relative to the reference time B 240. The second ink point 203-2 has an absolute age of 1.20 seconds; the third ink point 203-3 has an absolute age of 1.15 seconds; the fourth ink point 203-4 has an absolute age of 1.10 seconds; the fifth ink point 203-5 has a an absolute age of 1.05 seconds; the sixth ink point 203-6 has an absolute age of 1.00 seconds; the seventh ink point 203-7 has an absolute age of 0.95 seconds; the eighth ink point 203-8 has an absolute age of 0.90 seconds; the ninth ink point 203-9 has an absolute age of 0.85 seconds; the tenth ink point 203-10 has an absolute age of 0.80 seconds; the eleventh ink point 203-11 has an absolute age of 0.75 seconds; the twelfth ink point 203-12 has an absolute age of 0.70 seconds; the thirteenth ink point 203-13 has an absolute age of 0.65 seconds; the fourteenth ink point 203-14 has an absolute age of 0.60 seconds; the fifteenth ink point 203-15 has an absolute age of 0.55 seconds; the sixteenth ink point 203-16 has an absolute age of 0.50 seconds; the seventeenth ink point 203-17 has an absolute age of 0.45 seconds; the eighteenth ink point 203-18 has an absolute age of 0.40 seconds; the nineteenth ink point 203-19 has an absolute age of 0.35 seconds; the twentieth ink point 203-20 has an absolute age of 0.30 seconds; the twenty-first ink point 203-21 has an absolute age of 0.25 second; the twenty-second ink point 203-22 has an absolute age of 0.20 seconds; the twenty-third ink point 203-23 has an absolute age 243-23 of 0.15 seconds; the twenty-fourth ink point 203-24 has an absolute age of 0.10 seconds; the twenty-fifth ink point 203-25 has an absolute age of 0.05 seconds.

For the second ink stroke, since ink point 205-14 has a local time of t=1:03:07.57, ink point 205-14 is the anchor ink point and has an absolute age of 0. For the time space 210 at the reference time B 240, only the ink points up to through the anchor ink point (e.g., ink point 205-1 through ink point 205-14) would be rendered, as the rest of the ink points (e.g., ink point 205-15 through ink point 205-27) are drawn at a time after the reference time B 240.

The first ink point 205-1 has an absolute age of 0.65. An absolute age of 0.65 means that the first ink point 205-1 is 0.65 seconds old because it was drawn 0.65 seconds in the past, relative to the reference time B 240. The second ink point 205-2 has an absolute age of 0.60 seconds; the third ink point 205-3 has an absolute age of 0.55 seconds; the fourth ink point 205-4 has an absolute age of 0.50 seconds; the fifth ink point 205-5 has an absolute age of 0.45 seconds; the sixth ink point 205-6 has an absolute age of 0.40 seconds; the seventh ink point 205-7 has an absolute age of 0.35 seconds; the eighth ink point 205-8 has an absolute age of 0.30 seconds; the ninth ink point 205-9 has an absolute age 245-9 of 0.25 seconds; the tenth ink point 205-10 has an absolute age of 0.20 seconds; the eleventh ink point 205-11 has an absolute age of 0.15 seconds; the twelfth ink point 205-12 has an absolute age of 0.10 seconds; the thirteenth ink point 205-13 has an absolute age of 0.05 seconds.

Returning to FIG. 1, after identifying a reference time (160) and generating an absolute age (170), an ink effect can be applied to the ink stroke with a rhythm derived from when the ink stroke was originally drawn by using the absolute age of each ink point (180). The use of the absolute age allows the application of an ink effect to be consistent. Because the application of the ink effect is made consistent, every time the ink effect is repeated on the ink stroke, the ink effect will perform the same way, as expected.

A variety of ink effects can be applied to the ink stroke by using the absolute age. In some cases, ink effects that are based on how much time has passed since an ink point was drawn can be applied to the ink stroke. For example, absolute age can be used along with a threshold value to apply these ink effects.

In some cases, the threshold value informs the system of the absolute age at which to transition an ink point. For example, when each ink point reaches a certain absolute age identified by the threshold value, the ink point will transition. In other cases, the threshold value can inform the system of the maximum absolute age in which each ink point needs to be before the ink stroke no longer needs to be redrawn. For example, once all the ink points have an absolute age older than the threshold value, the system can stop refreshing the display and conserve resources.

Absolute age is needed to properly apply these ink effects because the ink effect may not start or end until a threshold value has been reached and a global timestamp does not provide the amount of time that has elapsed since the ink point has been drawn.

In some cases, the threshold value can be included in metadata of the ink stroke effect style. For example, when a user selects an ink effect to apply to the ink stroke, the system can receive the ink effect style data. The ink effect style data can be stored as a parameter in the ink stroke structure.

The ink effects can include, for example, a ripple effect or a glitter effect. In the ripple effect, ripples can form as the ink stroke is drawn and then fade away ink point-by-ink point (as they age out) after a period of time. In the glitter effect, glitter particles may be thrown off the ink stroke as the ink stroke is drawn. In some cases, the glitter particles may disappear after a certain amount of time (e.g., the threshold value). The system can use the absolute age to determine when to render the ink stroke without the particles.

Another type of ink effect may be an ink effect that changes based on the speed in which the ink stroke is drawn. For example, a rainbow ink effect can alternate through the colors of the rainbow based on the speed.

The ink effects can also include a drying effect. An example of a drying effect can be an ink stroke that looks shiny or an ink stroke that sparkles and then dries to plain black ink. Another example of a drying effect can include an ink stroke that starts out as a large size and then dries to a smaller size.

In some cases, ongoing animation ink effects can be applied to the ink stroke using the absolute age. When applying ongoing animation ink affects, the system can synchronize the ongoing animation to the absolute age so the animation stays in phase. When the animation stays in phase, the entire ink sequence looks the same as it was when the ink stroke was drawn. In cases where the ongoing animation is not synchronized to the absolute age, the playback of the ink stroke would not look the same as when the ink stroke was drawn.

Examples of ongoing animation effects can include, but are not limited to, a sparkle effect or a rainbow-colored cycling effect.

In some cases, the time can be manipulated, and the rhythm applied to the ink stroke may be modified. As an example of a modification to the original rhythm ("a derived rhythm"), an ink effect may show the drawing effects at a slower pace such that the effects appear more drawn out as compared to when the ink stroke was originally drawn. For example, the ink stroke could stay wet much longer or dry much faster.

In one case, the rhythm derived from when the ink stroke was originally drawn may be uniform or affine. Affine refers to a transformation which preserves points, straight lines and planes. For example, the affine rhythm may be a same rhythm. In another example, the affine rhythm may be a compressed (linearly) rhythm.

In another case, the rhythm derived from when the ink stroke was originally drawn may be a non-uniform or non-affine rhythm. For example, the non-affine rhythm may be an accelerating rhythm. In another example, the non-affine rhythm may be a decelerating rhythm. In yet another example, the non-affine rhythm may be a skewed rhythm.

In some cases, the time can be manipulated by applying a multiplier to the generated absolute age. The addition of the multiplier allows for full control over the time axis when an ink stroke is being rendered. Any derived rhythm created should have the same derivation applied to the threshold value (or any other time value used in rendering). The threshold value for the ink effect style can be changed to compensate for the manipulation of time. For example, if the rhythm is to be fast-forwarded, a multiplier can be applied the threshold value that informs the system of the absolute age at which to transition an ink point and one second then becomes two seconds.

Another advantage of using absolute age is the ability to apply an ink effect continuously across multiple ink strokes. For example, a common glitch during inking occurs when a stylus, pen, or user finger skips, and two separate ink strokes are drawn. If an ink effect is applied to the ink strokes without using the absolute age, the ink effect will not be seamless across the gap because the two ink strokes are completely unrelated now. However, since an ink effect is applied to ink strokes using the absolute age, the ink effect will continue where the last ink stroke left off with the appropriate tempo because the absolute age values can be continuous across multiple strokes.

In the examples of FIGS. 3A and 3B, the images are cycling through seven-time steps of an animation. The ink effect applied to the ink stroke in FIGS. 3A and 3B is a "barber pole" pattern. A barber pole pattern animation moves diagonal stripes along a length of an ink stroke in a manner that makes the stroke appear to be rotating around an axis along the stroke's center line. The transition from flat color to "barber pole" pattern is an example of how the absolute age can be used with the threshold value, where each ink point will transition when it reaches a certain value (the threshold value).

The ink strokes in FIGS. 3A and 3B include a break in the ink stroke. However, since the absolute age values are continuous for the ink points across multiple strokes in the same time space, the ink effect is applied seamlessly over the break in the ink stroke.

The example of FIG. 3A illustrates a scenario where an ink effect is applied to an already drawn ink stroke in a manner that appears that the pattern is taking over the ink stroke. At t=0, the ink stroke is shown in its current drawn state before applying the animation. At t=0, the system identifies a reference time, t, from which to represent a current time. Here, the reference time is the actual time. In some cases, the transition could start happening while the ink stroke is being drawn, depending on the ink point timestamps and the threshold value (see FIG. 3B for transition starting while ink stroke is being drawn).

The barber pole ink effect can be applied with a rhythm derived from when the ink stroke was originally drawn by using the absolute age of the ink point. As can be seen, the barber pole animation climbs across the ink stroke and continues to animate. The barber pole ink effect applied in FIG. 3A is a combination of both a one-time (e.g., a transition from a flat color to barber pole) and a repeating (e.g., the "spinning" of the barber pole ink effect) animation.

In particular, at each frame (e.g., t=1, t=2, t=3, t=4, t=5, and t=6), the time for that frame becomes the reference time and the absolute age of each ink point is generated. The absolute age of the start point, the end point, and the point at the threshold value for that frame is shown in FIG. 3A. As shown in the legend, "AA" refers to absolute age and the threshold value used for this example is 4. When an absolute age value reaches the threshold value, the effect transitions.

For example, at t=0, the absolute age of the start of the ink stroke is 4 and the absolute age of the end of the ink stroke is 0. Then, at t=1, the absolute age of the start of the ink stroke is 5 and the absolute age of the end of the ink stroke is 1. As can be seen, at the ink point where the absolute age is 4, the pixel associated with that ink point transitions.

The example of FIG. 3B illustrates a scenario where the drawing of the ink stroke is played back with a repeating (e.g., the "spinning" of the barber pole ink effect) animation. For example, a user may want to re-create the drawing of the initial ink stroke with the "barber pole" ink effect in a playback scenario. The ink effect may have already been applied during the drawing of the ink stroke or may be applied during a particular playback session. In some cases, the user can decide whether an ink effect would be applied in the playback scenario.

At t=0, the system identifies a reference time from which to represent a current time. Here, the reference time is the selected time in a previously recorded session (e.g., the time the user chose to re-play the drawing of the ink stroke) and no ink points have been rendered.

Absolute age of each ink point of the initial ink stroke is generated based on the reference time, where the first ink point identified at the start of the ink point is assigned an absolute age of 0.

The barber pole ink effect can then be applied with a rhythm derived from when the ink stroke was originally drawn by using the absolute age of the ink point. As can be seen, the barber pole animation animates while the ink stroke is drawn and continues to animate as the drawing of the ink stroke is re-played.

In particular, at each frame (e.g., t=1, t=2, t=3, t=4, t=5, and t=6), the time for that frame becomes the reference time and the absolute age of each ink point is generated, where ink points to the right may be negative values and ink points to the left are positive values. When an absolute age value reaches the threshold value, the pixel associated with that ink point or ink points transitions.

Figure 4:
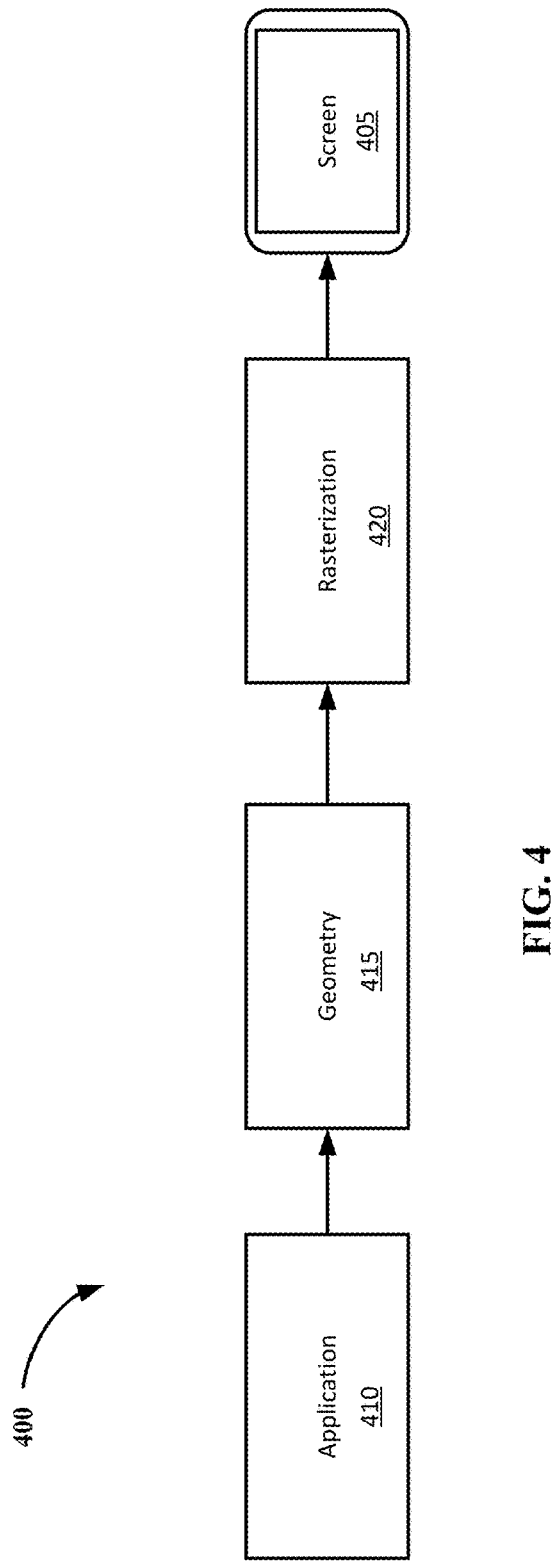
FIG. 4 illustrates an example graphics pipeline.

FIG. 4 illustrates an example graphics pipeline. Referring to FIG. 4, a graphics pipeline 400 is shown. The graphics pipeline 400 includes the steps a graphics system needs to perform to render content to a 2D screen (e.g., screen 405). The graphics pipeline 400 can be divided into three main parts, including application 410, geometry 415, and rasterization 420.

Figure 5:
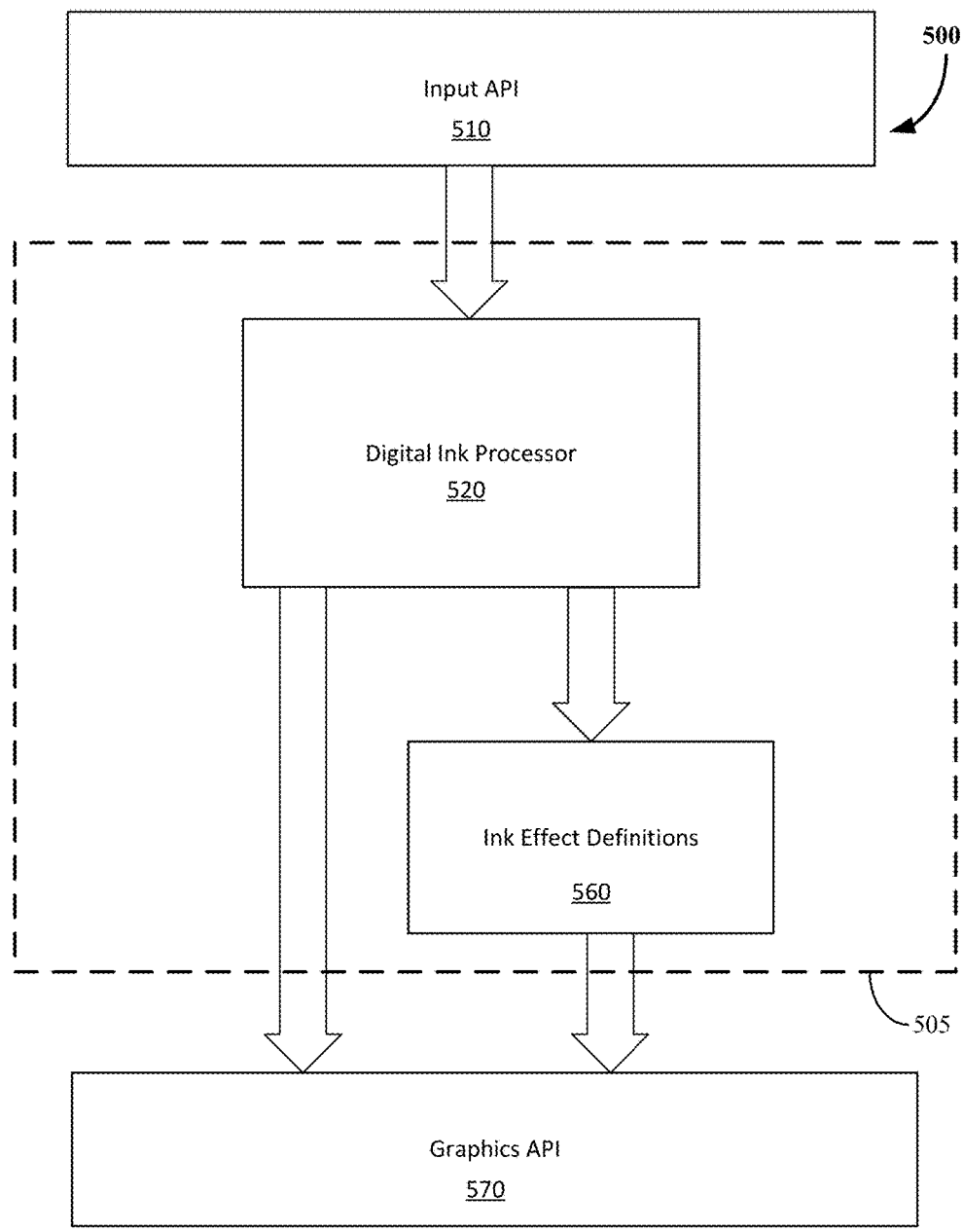
FIG. 5 illustrates a block diagram of a system enabled to accept ink inputs and apply effects to the ink objects in a digital ink system.

FIG. 5 illustrates a block diagram of a system 500 enabled to accept ink inputs and apply effects to the ink objects in a digital ink system, represented by dashed line 505. In one or more embodiments, the digital ink system 505 is implemented as an application (or a program of the operating system) that provides digital ink support to other applications (or programs of the operating system). The digital ink system 505 optionally includes an application programming interface (API) allowing the applications or other programs to interact with the functionality provided by the digital ink system 505. Alternatively, the digital ink system 505 can be implemented in an application and provide digital ink support for that application but not for other applications. Alternatively, the digital ink system 505 can be implemented as a combination thereof. For example, some functionality of the digital ink system 505 can be implemented in an application (or a program of the operating system) that provides digital ink support to other applications or programs, and other functionality of the digital ink system 505 can be implemented in the individual applications to which the digital ink system 505 provides support.

The digital ink system 505 processes the inputs received from the input application program interface (API) 510 (i.e., pointer inputs), and passes them for rendering to the graphics API 570, which in turn will pass the graphics of the digital ink system 505 (including ink objects) to an output device, such as, for example, a computer monitor or smartphone display. For example, the ink points can be sent to a rendering layer of the digital ink system 505, which then calls a graphics card driver API.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API implementing component. The API is generally a set of programming instructions and standards for enabling two or more applications to communicate with each other.

Figure 7:
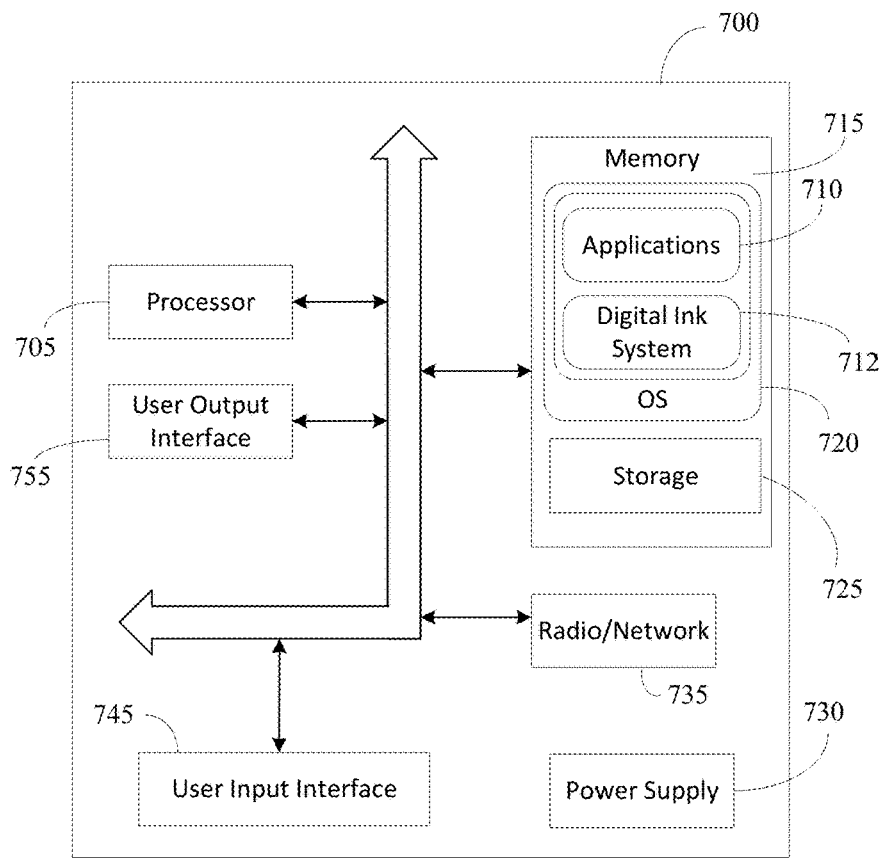
FIG. 7 shows a block diagram illustrating components of a computing device used in some embodiments.

The system 500 can be part of a computing device such as described with respect to FIG. 7, and may receive pointer inputs from input devices such as mice, keyboards, remote controls, and the like, or from natural user input (NUI) methods including those relying on speech recognition, touch and stylus recognition, gesture recognition both on screen and adjacent to the screen, air gestures, head and eye tracking, voice and speech, vision, touch, hover, gestures, and machine intelligence. Pointer inputs are those inputs that define a user's point of interaction within a graphical user interface, such as by a cursor represented within a given program or application and associated with a given input device. Inputs may be interpreted by the input API 510 for use in the digital ink system 505 as digital ink input. A user may signal to the system 500 that ink input is desired, as opposed to other styles of input, by selecting an ink input user interface (UI) element, using a particular input device, or contextually based on a position of a pointer in the digital ink system 505. For example, a user may use an ink input stylus on a touch screen to indicate that inking input is desired (as opposed to positional input via a mouse device), inking input may be enabled in a canvas area of a content creation application, or inking input may be enabled when a user actuates a mouse button (as opposed to positional input when the mouse button is unactuated). When the user has indicated that ink input is desired, the input API 510 receives the inputs from the input devices, and transmits coordinates and pressures (if available on a touch-based device) and other metadata to the digital ink system 505. The other metadata may include, but is not limited to: a device identifier (e.g., stylus one, stylus two), primary or secondary input (e.g., mouse button one or two, stylus nib or "eraser"), velocity of input, authoring mode of when input is received (e.g., editing mode, presentation mode, textbox input, freeform input), user-defined settings within the digital ink system 505, etc.

Input from the input API 510 is received by an ink stroke processor 520, which can interface with the graphics pipeline described with respect to FIG. 4. The ink stroke processor 520 can perform processes 100 and 190. Ink stroke data can be passed to an application and through the graphics pipeline to an operating systems graphics API 570, for example, after creating geometries to be associated with the ink stroke based on drawing parameters. The drawing parameters may also indicate an ink effect to apply to the stroke or options for the ink effect. The ink stroke processor 520 uses these inputs to create the geometry of the stroke as it will be seen in the GUI. These geometries are passed to the graphics API 570 and may include an ink effect definition 560, when an ink effect has been selected by a user, so that the user can see the ink effect applied to the stroke while the user makes that stroke in the GUI, for example, seeing the "ink" flowing from a stylus into the GUI or the barber pole animation such as shown in FIGS. 3A and 3B.

The application can receive the ink stroke data, and the ink stroke data, including relative age, can be stored within the document's framework, for example, as an object in an extensible markup language (XML) hierarchy or a JavaScript Object Notation (JSON) representation.

The ink effect definitions 560 define additional graphical effects that are applied to the geometries of the strokes shown in the GUI. These effects may be shown in various layers and various behaviors that are set by the user. The definitions include image files (e.g., bitmap, GIF (graphics interchange format), JPEG (joint photographic experts group), PNG (portable network graphic)) as well as color gradients (defining various colors to use in series with a stroke). In some aspects, animated images, such as animated GIFs, may be used as the image files for ink effect definitions 560 so that an animated effect. such as, for example, a flash, sparkle, wave, fade, pulse, etc., may be applied to the ink object.

The graphics API 570 handles the geometries and rendered graphical effects so that they will be displayed according to the display devices associated with the system 500. The geometries and ink effect definitions 560 are converted to pixel values appropriate for the user's display device and any overlay effects are provided. For example, for a given geometry and ink effect definition, the graphics API 570 may render the ink object according to a first way (having x pixels with various hues and luminosities) when the ink object is displayed on a first display device but render the ink object according to a second way (having y pixels with various hues and luminosities) on a second display device, such as, for example, when a user views a presentation on a laptop monitor and switches display to a projector with a different resolution and color properties.

Figure 6:
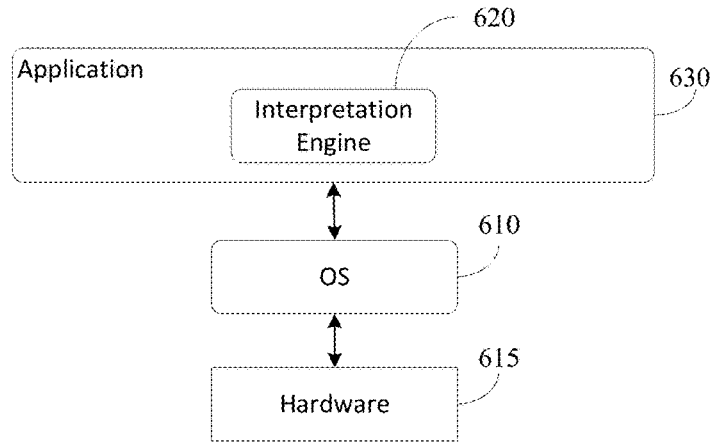
FIG. 6 shows a block diagram illustrating architecture for a computing device used in some embodiments.

An illustrative architecture for a user computing device is provided with reference to FIGS. 6 and 7.

Referring to FIG. 6, the architecture for the user computing device can include a device operating system (OS) 610. The device OS 610 manages user input functions, output functions, storage access functions, network communication functions, and other functions for the device. The device OS 610 may be directly associated with the physical resources of the device or running as part of a virtual machine backed by underlying physical resources. According to many implementations, the device OS 610 includes functionality for recognizing user gestures and other user input via the underlying hardware 615.

An interpretation engine 620 of an application 630 running on the device OS 610 listens (e.g., via interrupt, polling, and the like) for user input event messages from the device OS 610. The UI event messages can indicate a panning gesture, flicking gesture, dragging gesture, or other gesture on a touchscreen of the device, a tap on the touch screen, digital ink input, keystroke input, or other user input (e.g., voice commands, directional buttons, trackball input). The interpretation engine 620 translates the UI event messages into messages understandable by the application.

FIG. 7 shows a block diagram illustrating components of a computing device used in some embodiments. Referring to FIG. 7, system 700 represents a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 700 may be incorporated to implement a particular computing device.

System 700 includes one or more processors 705 that processes data according to instructions of one or more application programs 710, and/or operating system 720. Examples of processors 705 include general purpose central processing units (CPUs), graphics processing units (GPUs), application specific processors, and logic devices, as well as any other type of processing device, combinations, or variations thereof. Processor 705 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor), network connectivity components (e.g., including Radio/network interface 735), and user input interface 745 components.

The one or more application programs 710, including digital ink system 712 may be loaded into memory 715 and run on or in association with the operating system 720. In some cases, digital ink system 712 may be included as part of the one or more application programs 710. Device operating systems generally control and coordinate the functions of the various components in the computing device, providing an easier way for applications to connect with lower level interfaces like the networking interface 735 and some components of user input interface 745 or user output interface 755. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 7, can be thought of as additional, nested groupings within the operating system space, each containing an OS, application programs, and APIs.

Memory 715 may comprise any computer readable storage media readable by the processor 705 and capable of storing software 710 the application 710, OS 720, and digital ink system 712.

Memory 715 may include volatile and nonvolatile memory (such as storage 725), removable and non-removable media implemented in any method or technology for storage of information, such as computer readable instructions, data structures, program modules, or other data. Examples of storage media of memory 715 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory, propagated signal.

Memory 715 may be implemented as a single storage device but may also be implemented across multiple storage devices or sub-systems co-located or distributed relative to each other. Memory 715 may include additional elements, such as a controller, capable of communicating with processor 705. Memory 715 may include multiple buffers.

System 700 has a power supply 730, which may be implemented as one or more batteries and/or an energy harvester (ambient-radiation, photovoltaic, piezoelectric, thermoelectric, electrostatic, and the like). Power supply 730 may further include an external power source, such as an AC adapter or a powered docking cradle that supplements or recharges the batteries.

System 700 may also include a radio/network interface 735 that performs the function of transmitting and receiving radio frequency communications. The radio/network interface 735 facilitates wireless connectivity between system 700 and the "outside world," via a communications carrier or service provider. Transmissions to and from the radio/network interface 735 are conducted under control of the operating system 720, which disseminates communications received by the radio/network interface 735 to application programs 710 and vice versa.

The radio/network interface 735 allows system 700 to communicate with other computing devices, including server computing devices and other client devices, over a network.

The system can further include a user interface system with user input interface 745 and user output interface 755, which may include input/output (I/O) devices and components that enable communication between a user and the system 700. User input interface 745 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. For inclusion of the inking, the user input interface 745 at least includes a touch-based user input interface or a digitizing pen used in place of or as part of the touch-based user input interface. A touch-based user input interface can include a touchscreen and/or surface with sensing components for a digitizer.

The user output interface 755 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

Visual output may be depicted on the display in myriad ways, presenting graphical user interface elements, text, images, video, notifications, virtual buttons, virtual keyboards, or any other type of information capable of being depicted in visual form.

The user interface system may also include user interface software and associated software (e.g., for graphics chips and input devices) executed by the OS 720 in support of the various user input and output devices. The associated software assists the OS 720 in communicating user interface hardware events to application programs using defined mechanisms. The user interface system including user interface software may support a graphical user interface, a natural user interface, or any other type of user interface. Certain aspects of the described digital ink system 712 and the processes 100 and 190 may include or interface with the user interface software.

Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A method for applying an ink effect to a drawing of an ink stroke, the method comprising:
    identifying a reference time from which to represent a current time of an inking session in which ink stroke content is rendered;
    generating an absolute age of each ink point of the ink stroke based on the reference time;
    applying the ink effect to the ink stroke with a rhythm derived from when the ink stroke was originally drawn by using the absolute age of each ink point; and
    displaying the ink stroke with the applied ink effect.

2. The method of claim 1, wherein the reference time is identified for every frame.

3. The method of claim 2, wherein, for each frame, the generating of the absolute age of each ink point of the ink stroke based on the reference time comprises:
    calculating a difference between a local time of the ink point and the reference time for the frame.

4. The method of claim 1, wherein the rhythm derived from when the ink stroke was originally drawn is an accelerating rhythm.

5. The method of claim 1, wherein the rhythm derived from when the ink stroke was originally drawn is a same rhythm.

6. The method of claim 1, wherein applying the ink effect to the ink stroke with the rhythm derived from when the ink stroke was originally drawn by using the absolute age of each ink point comprises:
    applying a multiplier to the absolute age of each ink point.

7. The method of claim 1, wherein the ink effect comprises an animation ink effect.

8. The method of claim 7, wherein the animation ink effect comprises a drying out effect or a cooling down effect that starts or ends once the absolute age reaches a threshold.

9. One or more computer-readable storage media having instructions stored thereon that when executed by a processor, direct the processor to at least:
- identify a reference time from which to represent a current time of an inking session in which ink stroke content is rendered;
- generate an absolute age of each ink point of an ink stroke based on the reference time;
- apply an ink effect to the ink stroke with a rhythm derived from when the ink stroke was originally drawn by using the absolute age of each ink point; and
- display the ink stroke with the applied ink effect.

10. The media of claim 9, wherein the rhythm derived from when the ink stroke was originally drawn is a decelerating rhythm.

11. The media of claim 9, wherein the rhythm derived from when the ink stroke was originally drawn is a skewed rhythm.

12. The media of claim 9, wherein the rhythm derived from when the ink stroke was originally drawn is an accelerating rhythm.

13. The media of claim 9, wherein the rhythm derived from when the ink stroke was originally drawn is a same rhythm.

14. The media of claim 9, wherein the rhythm derived from when the ink stroke was originally drawn is a compressed rhythm.

15. The media of claim 9, wherein the rhythm derived from when the ink stroke was originally drawn is an affine rhythm.

16. The media of claim 9, wherein the rhythm derived from when the ink stroke was originally drawn is a non-affine rhythm.

17. A system comprising:
- a processor;
- one or more computer-readable storage media; and
- instructions stored thereon that when executed by the processor, direct the processor to at least:
- identify a reference time from which to represent a current time of an inking session in which ink stroke content is rendered;
- generate an absolute age of each ink point of an ink stroke based on the reference time;
- apply an ink effect to the ink stroke with a rhythm derived from when the ink stroke was originally drawn by using the absolute age of each ink point; and
- display the ink stroke with the applied ink effect.

18. The system of claim 17, wherein the generating of the absolute age of each ink point of the ink stroke based on the reference time comprises:
- identify the reference time for every frame; and
- calculate a difference between a local time of the ink point and the reference time for the frame.

19. The system of claim 17, wherein the rhythm derived from when the ink stroke was originally drawn is an accelerating rhythm.

20. The system of claim 17, wherein the rhythm derived from when the ink stroke was originally drawn is a same rhythm.

* * * * *